(12) United States Patent
Franz et al.

(10) Patent No.: US 11,833,931 B2
(45) Date of Patent: Dec. 5, 2023

(54) MOTOR VEHICLE SEAT WITH LYING FUNCTION

(71) Applicant: Bayerische Motoren Werke Aktiengesellschaft, Munich (DE)

(72) Inventors: Matthias Franz, Neubeuern (DE); Michael Wokrinek, Bruckberg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/642,638

(22) PCT Filed: Aug. 19, 2020

(86) PCT No.: PCT/EP2020/073234
§ 371 (c)(1),
(2) Date: Mar. 11, 2022

(87) PCT Pub. No.: WO2021/047870
PCT Pub. Date: Mar. 18, 2021

(65) Prior Publication Data
US 2022/0410764 A1    Dec. 29, 2022

(51) Int. Cl.
*B60N 2/02* (2006.01)
*B60N 2/90* (2018.01)
(Continued)

(52) U.S. Cl.
CPC ............. *B60N 2/0244* (2013.01); *B60N 2/20* (2013.01); *B60N 2/976* (2018.02); *B60N 2/995* (2018.02);
(Continued)

(58) Field of Classification Search
CPC ......... A47C 1/034; A47C 1/037; A47C 7/506; A47C 7/5062; A47C 7/5064;
(Continued)

(56) References Cited

U.S. PATENT DOCUMENTS

| 6,095,610 A | 8/2000 | Ikajima et al. |
| 7,717,868 B2 * | 5/2010 | Inada .................. A61H 9/0078 601/149 |

(Continued)

FOREIGN PATENT DOCUMENTS

| CN | 201501321 U | 6/2010 |
| CN | 105658478 A | 6/2018 |

(Continued)

OTHER PUBLICATIONS

International Search Report (PCT/ISA/210) issued in PCT Application No. PCT/EP2020/073234 dated Nov. 13, 2020 with English translation (four (4) pages).

(Continued)

*Primary Examiner* — Syed A Islam
(74) *Attorney, Agent, or Firm* — Crowell & Moring LLP

(57) ABSTRACT

A motor vehicle seat with a lying function has a seat cushion, a backrest which is arranged on a first end region of the seat cushion, and a calf support which can be elongated and which is arranged on a second end region of the seat cushion. The calf support is provided with a lifting device for lifting two outer support panels out of a rest position and into a support position which protrudes beyond a support surface of the calf support.

11 Claims, 4 Drawing Sheets

(51) Int. Cl.
 *B60N 2/20*    (2006.01)
 *A47C 1/034*    (2006.01)
 *A47C 7/50*    (2006.01)
 *B60N 3/06*    (2006.01)
 *B64D 11/06*    (2006.01)

(52) U.S. Cl.
 CPC .............. *A47C 1/034* (2013.01); *A47C 7/506* (2013.01); *B60N 3/06* (2013.01); *B64D 11/0643* (2014.12)

(58) Field of Classification Search
 CPC ...... A47C 7/5066; A47C 7/5068; B60N 3/06; B60N 3/063; B60N 2/976; B60N 2/995; B64D 11/0643
 See application file for complete search history.

(56) References Cited

U.S. PATENT DOCUMENTS

| | | | |
|---|---|---|---|
| 11,117,539 B2* | 9/2021 | Masuda | B60N 3/066 |
| 2006/0186721 A1* | 8/2006 | Flory | B60N 2/995 |
| | | | 297/423.36 |
| 2007/0016119 A1 | 1/2007 | Inada et al. | |
| 2016/0318426 A1 | 11/2016 | Aita et al. | |
| 2018/0251044 A1 | 9/2018 | Line et al. | |

FOREIGN PATENT DOCUMENTS

| | | |
|---|---|---|
| CN | 208248017 U | 12/2018 |
| CN | 208682692 U | 4/2019 |
| JP | 9-154667 A | 6/1997 |
| JP | 11-332687 A | 12/1999 |
| JP | 2005-204839 A | 8/2005 |
| JP | 2008-110245 A | 5/2008 |
| JP | 2008-237295 A | 10/2008 |
| JP | 2010-82099 A | 4/2010 |

OTHER PUBLICATIONS

German-language Written Opinion (PCT/ISA/237) issued in PCT Application No. PCT/EP2020/073234 dated Nov. 13, 2020 (five (5) pages).

German-language Search Report issued in German Application No. 10 2019 124 570.2 dated Aug. 10, 2020 with partial English translation (10 pages).

English translation of Chinese-language Office Action issued in Chinese Application No. 202080061517.5 dated Mar. 31, 2023 (6 pages).

\* cited by examiner

MOTOR VEHICLE SEAT WITH LYING FUNCTION

BACKGROUND AND SUMMARY OF THE INVENTION

The invention relates to a motor vehicle seat with a lying function.

Motor vehicle seats of this type generally have a calf support which lifts the legs of the person sitting on the seat and, in the process, supports the calves in the lying position.

In the case of previously known calf supports, the calves cannot be prevented from slipping off, for example during cornering, since the surface of the calf support is flat and is rounded downward on the outside. Therefore, even when small lateral forces occur, for example during cornering, the legs may slip off the calf support.

It is therefore the object of the present invention to provide a motor vehicle seat which permits improved positional securing in particular of the legs of a person located on the seat, in particular when the latter has been set into the lying position.

According to the invention, a motor vehicle seat with a lying function is provided, which is provided with a seat cushion, at the first end region of which a backrest is articulated. An extendable calf support is provided at the second, oppositely arranged end region of the seat cushion.

According to the invention, the calf support is provided with a lifting device by means of which the two outer support plates can be lifted from an inoperative position into a support position in which the support plates protrude beyond the supporting surface of the calf support.

According to the invention, the definition "outer support plates" means that the support plates are located adjacent to the outer longitudinal edges of the calf support.

The outer support plates are preferably lifted as the calf support is being extended, this taking place, for example, during the rotation of a vehicle seat into the lying position, in order to achieve a larger supporting surface of the calf support. When the calf support is extended, the outer support plates then protrude over the supporting surface of the calf support so that the legs of a person using the motor vehicle seat according to the invention can be prevented from slipping off since the legs can be placed against the outer support plates if lateral forces act on the legs.

In a further particularly preferred embodiment, a central plate is arranged between the outer support plates, which central plate can likewise be lifted by means of the lifting device from the inoperative position into an end position corresponding to the support position of the support plates.

In this case, in a particularly preferred embodiment, it is possible to provide a central plate with massage pads, in particular in the form of inflatable air pads, which are arranged on the sides of the central plate that face the support plates.

In order to improve the massage effect even further, it is possible, in a further particularly preferred embodiment, also to provide the support plates with massage pads, in particular in the form of air pads, which are arranged on the sides of the support plates that face the central plate.

When actuated, the massage pads can be filled and emptied by pneumatics, for example an air pump, and can carry out the massage function by means of fluctuations in the quantity of air and pressure.

Further details, features and advantages of the invention emerge from the description below of a particularly preferred exemplary embodiment with reference to the drawings.

DETAILED DESCRIPTION OF THE DRAWINGS

Figure 1:
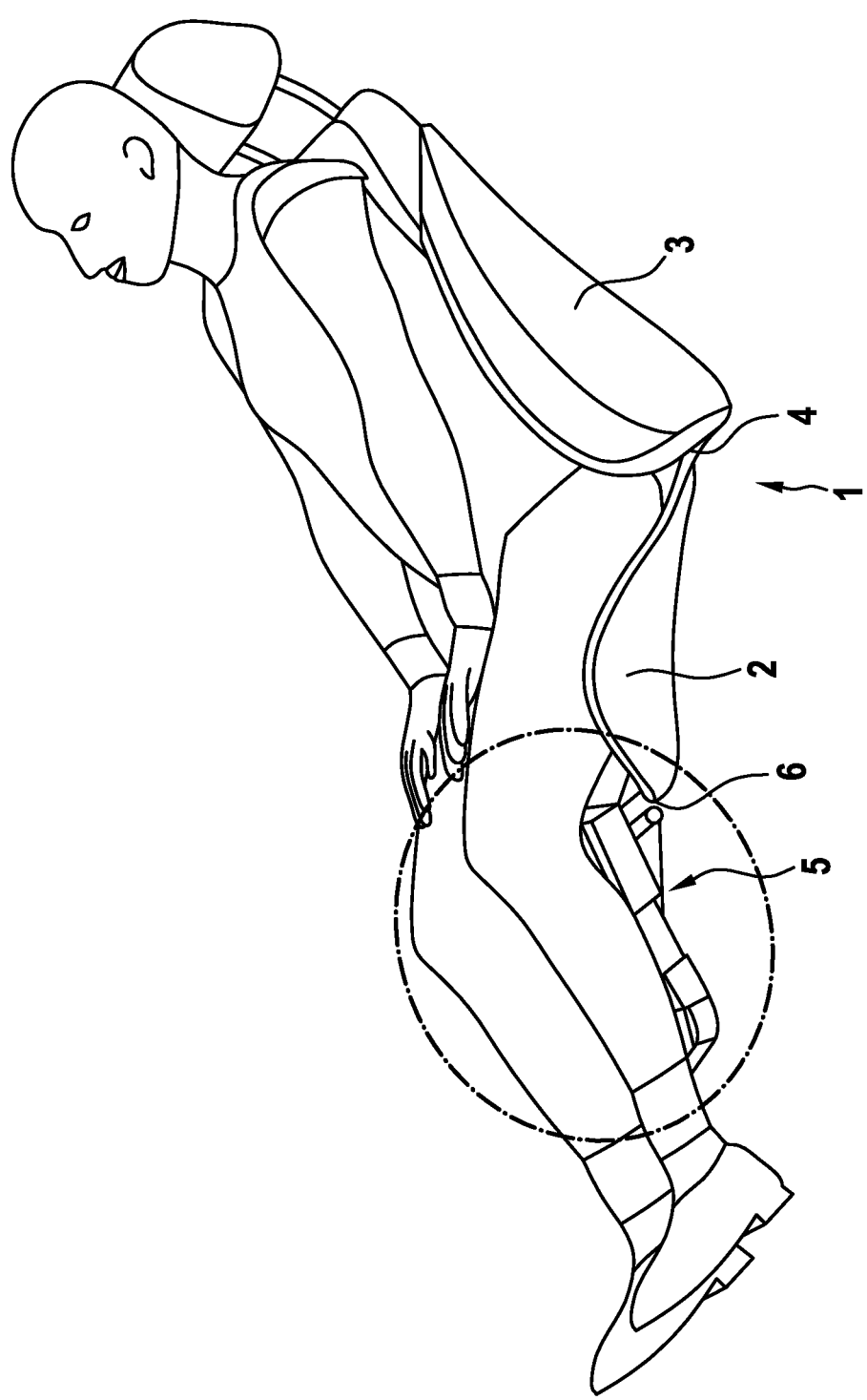
FIG. 1 is a perspective, slightly simplified illustration of a motor vehicle seat according to an embodiment of the invention with a lying function.

FIG. 1 shows, in a perspective illustration, a motor vehicle seat 1 with a lying position. The motor vehicle seat 1 has a seat cushion 2 and a backrest 3 which is articulated at a first end region 4 of the seat cushion 2.

An extendable calf support 5 is attached to a second end region 6 of the seat cushion 2.

Figure 2:
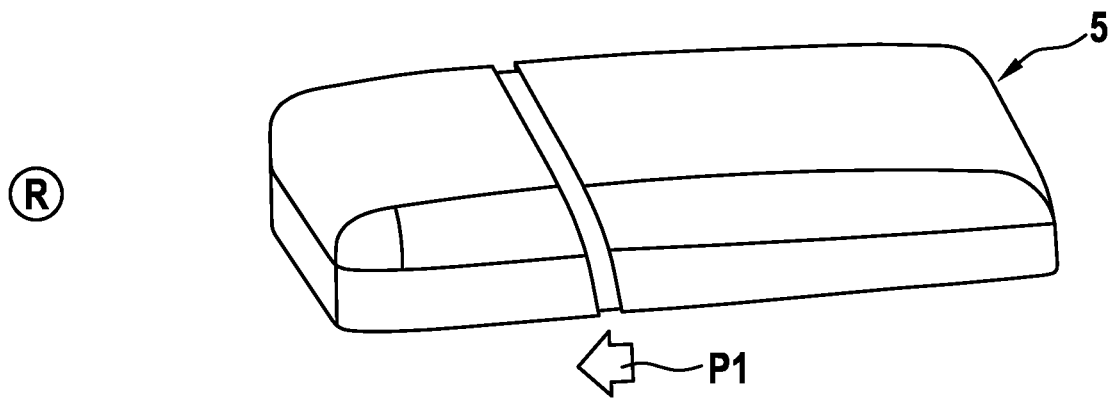
FIG. 2 is a perspective, slightly simplified illustration of a calf support which constitutes the encircled detail of the motor vehicle seat in FIG. 1.
Figure 3:
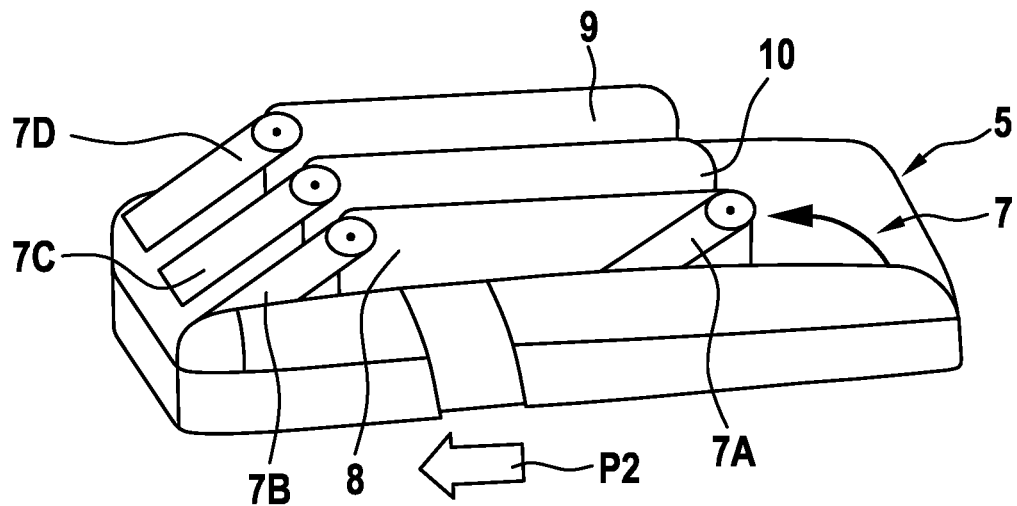
FIG. 3 is an illustration corresponding to FIG. 2 in an intermediate phase of the extension of the calf support.
Figure 4:
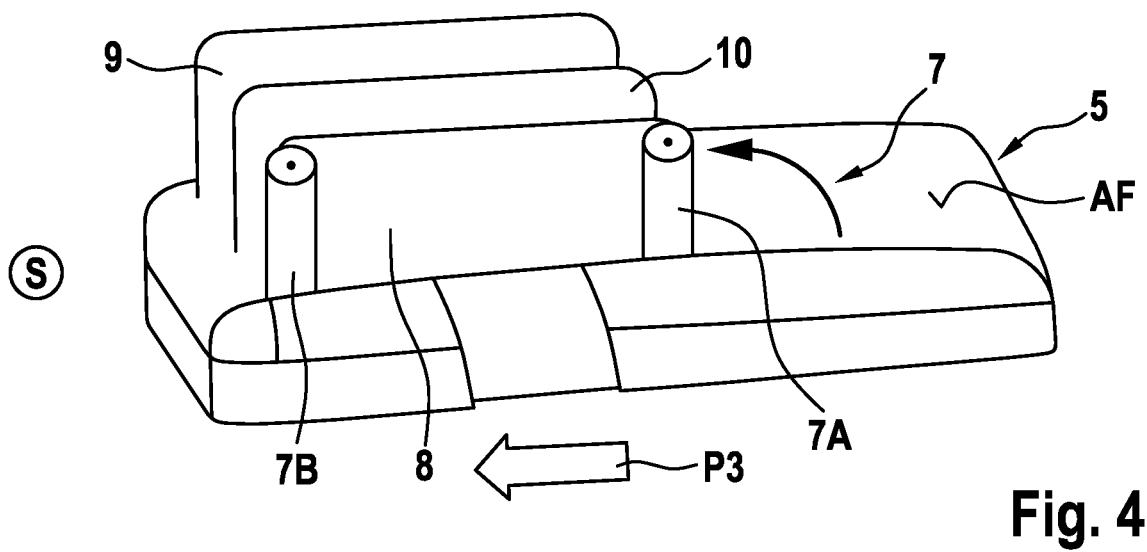
FIG. 4 is an illustration corresponding to FIGS. 2 and 3 of the calf support in its extended end position.

As emerges from an overall view of FIGS. 2 to 4, the calf support 5 is provided with a lifting device 7 which is symbolized in FIGS. 3 and 4 by two curved arrows identified by reference sign 7. The lifting device 7 can be designed, for example, as a linkage which is symbolized by the partially visible rods 7A to 7D. A linkage of this type can be articulated at one end on outer support plates 8 and 9 and at the other end on a correspondingly suitable region of the calf support 5 and can be actuale, for example, by motor or else manually.

As the sequence of FIGS. 2, 3 and 4 clarifies, the calf support 5 will be extended in a stepwise manner from a starting position via a first intermediate position according to FIG. 2 (symbolized by the arrow P1) into a second intermediate position in FIG. 3 (symbolized by the arrow P2) and an end position, shown in FIG. 4, wherein the end position in FIG. 4 is symbolized by the arrow P3.

Figure 5:
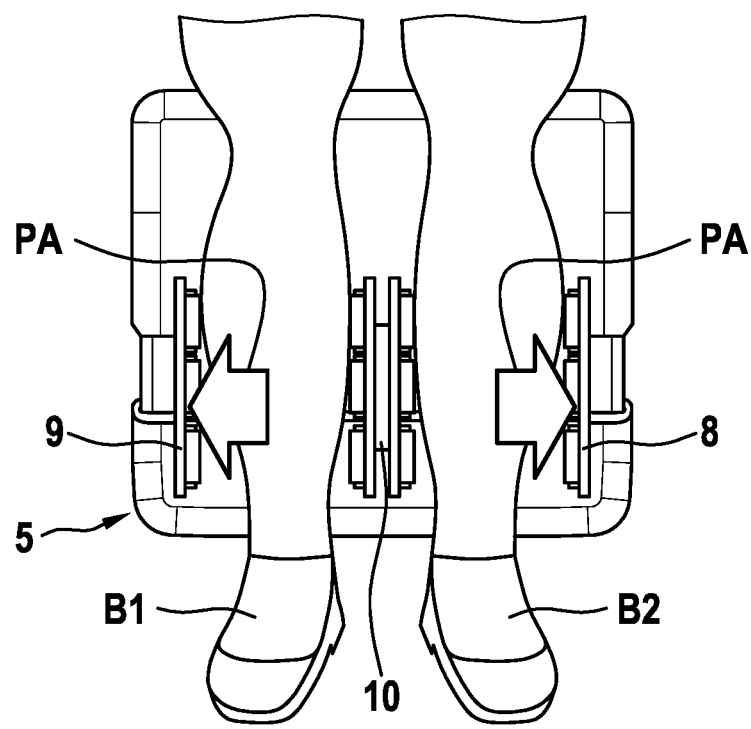
FIG. 5 is a top view of the calf support for illustrating the support action of support plates for legs of a person using the motor vehicle seat.

Preferably, as the calf support 5 undergoes this extension, the lifting device 7 can lift the outer support plates 8, 9 from an inoperative position R shown in FIG. 2 into a support position S shown in FIG. 4. FIG. 4 clarifies here that, in the support position S, the support plates 8 and 9 protrude beyond the supporting surface AF of the calf support 5. In this position, the support plates 8 and 9 can support the legs B1 and B2 of a person using the motor vehicle seat 1, and can therefore avoid the legs B1 and B2 sliding off from the calf support 5, this support being symbolized by the two arrows PA in FIG. 5.

Figure 6:
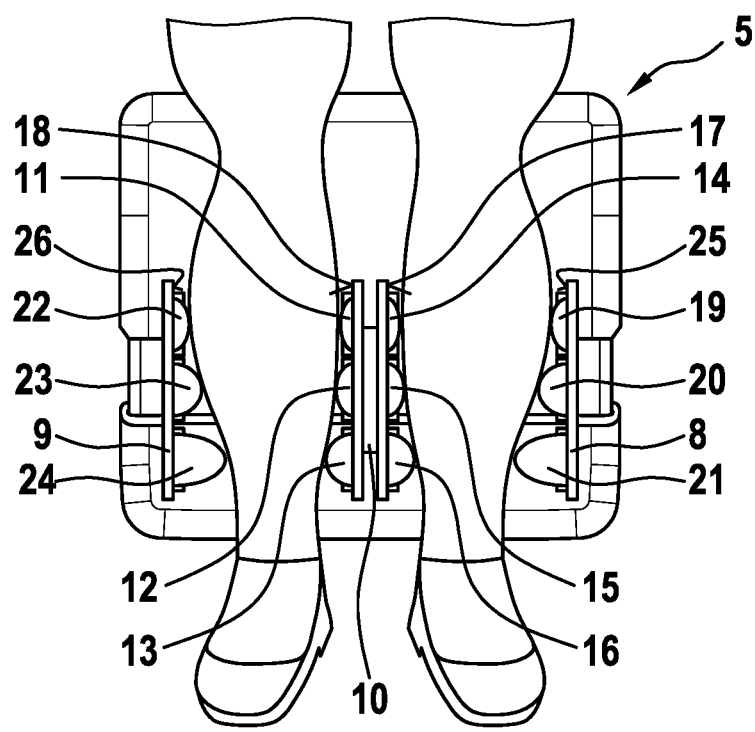
FIG. 6 is an illustration corresponding to FIG. 5 of the calf support, in which the support plates and a central plate are provided with massage pads.

FIG. 6 clarifies a further particularly preferred embodiment of the motor vehicle seat 1, in which, as in the embodiment according to FIGS. 2 to 5, a central plate 10 arranged between the support plates 8 and 9 is provided. The central plate 10 can likewise be lifted and lowered by the lifting device 7, specifically likewise as the calf support 5 is being extended in accordance with the illustration of FIGS. 2 to 4.

Massage pads 11 to 16 can be attached to the central plate 10, wherein the massage pads 11 to 16 are each arranged on the sides 17, 18 of the central plate 10 that face the support plates 8 and 9, respectively.

The provision of such massage pads on the central plate 10 already enables the calves of a person using the motor vehicle seat 1 to be massaged.

However, FIG. 6 shows a particularly preferred embodiment in which the support plates 8 and 9 are also provided with massage pads 19, 20, 21 and 22, 23, 24, respectively, which are each arranged on the sides 25, 26 of the support plates 8 and 9 that face the central plate 10. The massage action can be considerably improved by these additional massage pads.

Figure 7:
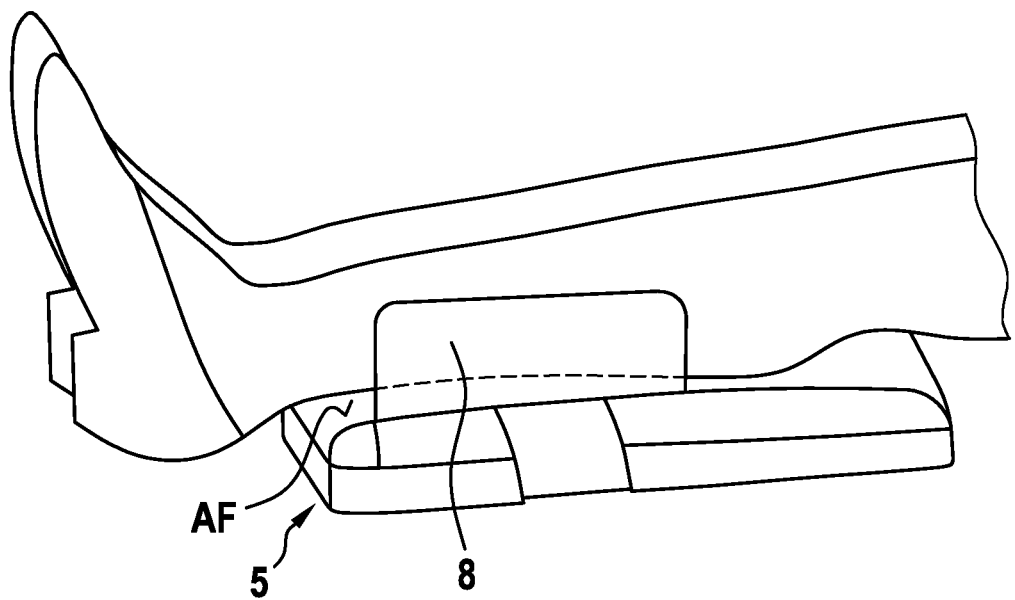
FIG. 7 is a perspective, slightly simplified illustration of the calf support, in which an extended support plate for supporting the calves of a person using the motor vehicle seat is illustrated.

FIG. 7 once again shows the effect of one of the support plates, in this case the support plate 8 of the calf support 5, which, in the extended state, protrudes over the supporting surface AF and can therefore carry out the support function, explained at the beginning, for the calves of a person using the motor vehicle seat 1.

In addition to the written disclosure of the invention above, reference is hereby explicitly made, as an addition to the disclosure of the invention, to the illustration provided by the drawings of the invention in FIGS. 1 to 7.

LIST OF REFERENCE SIGNS

1 Motor vehicle seat
2 Seat cushion
3 Backrest
4 First end region
5 Calf support
6 Second end region
7 Lifting device
8, 9 Support plates
10 Central plate
11-16 Massage pads/air pads
17, 18 Sides facing the support plates 8, 9
19-24 Massage pads/air pads
25, 26 Sides facing the central plate 10
AF Supporting surface
P1-P3 Arrows for clarifying the extension of the calf support 5
B1, B2 Legs of a person using the motor vehicle seat 1
R Inoperative position
S Support position

What is claimed is:

1. A motor vehicle seat with a lying function, comprising:
a seat cushion;
a backrest which is arranged at a first end region of the seat cushion;
an extendable calf support which is arranged at a second end region of the seat cushion;
two outer support plates; and
a lifting device, wherein
the calf support is provided with the lifting device for lifting the two outer support plates from an inoperative position into a support position protruding beyond a supporting surface of the calf support, wherein
the lifting device lifts the support plates as the calf support is being extended.

2. The motor vehicle seat according to claim 1, wherein the lifting device is actuable manually or by motor.

3. A motor vehicle seat with a lying function, comprising:
a seat cushion;
a backrest which is arranged at a first end region of the seat cushion;
an extendable calf support which is arranged at a second end region of the seat cushion;
two outer support plates;
a central plate arranged between the two outer support plates; and
a lifting device, wherein
the calf support is provided with the lifting device for lifting the two outer support plates from an inoperative position into a support position protruding beyond a supporting surface of the calf support, and
the central plate is liftable via the lifting device from the inoperative position into an end position corresponding to the support position.

4. The motor vehicle seat according to claim 3, wherein the central plate is lifted as the calf support is being extended.

5. The motor vehicle seat according to claim 3, wherein the central plate is provided with massage pads which are arranged on sides of the central plate that face the outer support plates.

6. The motor vehicle seat according to claim 5, wherein the outer support plates are provided with massage pads which are arranged on sides of the outer support plates that face the central plate.

7. The motor vehicle seat according to claim 3, wherein the outer support plates are provided with massage pads which are arranged on sides of the outer support plates that face the central plate.

8. The motor vehicle seat according to claim 5, wherein the massage pads are designed as air pads.

9. The motor vehicle seat according to claim 6, wherein the massage pads are designed as air pads.

10. The motor vehicle seat according to claim 8, wherein the massage pads or air pads are variable in their size.

11. The motor vehicle seat according to claim 8, wherein the massage pads or air pads are variable in respect of an applied pressure.

\* \* \* \* \*